Figure 1:
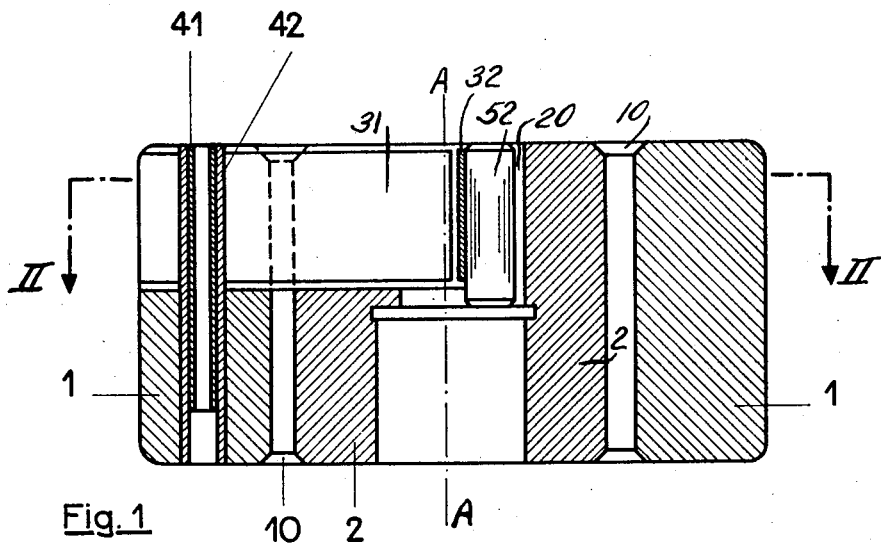

July 31, 1956  J. WEBER ET AL  2,757,050
SUSPENSION ARRANGEMENT FOR OSCILLATION ABOUT AN AXIS
Filed June 9, 1953

INVENTORS
JOSEF WEBER,
JOSEF GRAB AND
HANS PRIBITZER
BY:

United States Patent Office 2,757,050
Patented July 31, 1956

2,757,050

SUSPENSION ARRANGEMENT FOR OSCILLATION ABOUT AN AXIS

Josef Weber, Adliswil, Josef Grab, Schindellegi, and Hans Pribitzer, Wadenswil, Switzerland, assignors to Contraves A.-G., Zurich, Switzerland Application June 9, 1953, Serial No. 360,448

17 Claims. (Cl. 308—2)

The present invention relates to suspension arrangements for oscillation about an axis, and more particularly to a suspension arrangement for suspending a turnable member in such manner that the member is free to perform limited oscillations about its axis, but is prevented from movement in transverse and axial directions.

It is known to support an oscillatable member on filaments which permit oscillation practically free of friction. However, the known arrangements of this type are incapable of preventing transverse or axial movement of the oscillatable member under the action of transverse or axial forces.

It is one object of the present invention to overcome the disadvantages of the known suspension arrangements for oscillatable members, and to provide a friction-free suspension arrangement supporting a member for oscillating movement about its axis, but preventing transverse and axial movement of the oscillatable member.

It is another object of the present invention to provide a suspension arrangement in which a member is supported on a plurality of radially extending suspension ribbons in such manner as to permit oscillation of the member about its axis, while preventing a transverse or axial movement of the oscillatable member under the action of strong forces as may be present when the apparatus is used in rapidly accelerated or turned aircraft.

It is still a further object of the present invention to provide a suspension arrangement in which an oscillatable member is suspended in such a manner as to be adapted to support for oscillating movement a measuring element used in aircraft, while preventing transverse or axial movement of the measuring element under the action of forces created during the flight.

It is also an object of the present invention to provide an axially extending chamber in the oscillatable member, and to clamp the radially extending ribbons supporting the oscillatable member in the axial chamber by means of clamping pins.

With these objects in view the present invention mainly consists in a suspension arrangement for oscillation about an axis comprising, in combination, an outer annular member having an axis, an inner member having an axis coinciding with the axis of the outer annular member, the inner member being surrounded by the outer annular member, and tensioned suspension ribbon means extending in radial direction and having outwardly located portions secured to the outer annular member, and inwardly located portions secured to the inner member, one of the members being suspended by the suspension ribbon means on the other of the members for oscillation about the axis thereof and adapted to support the movable member of an instrument for angular movement, the tensioned suspension ribbon means preventing transverse and axial movement of the one suspended member relative to the other member.

According to a preferred embodiment of the present invention the suspension arrangement comprises, in combination, oscillatable means having an axis of rotation and being formed with at least four radial slots, and with an axially extending square inner chamber bounded by four walls, the inner ends of the radial slots opening at the centers of the walls, four clamping pins located in the central chamber abutting against the walls, two of the clamping pins being resilient, and the other two of the clamping pins being cylindrical and non-resilient, the resilient and the non-resilient clamping pins being alternately arranged, supporting means surrounding the oscillatable means, and at least two tension suspension ribbon means, each suspension ribbon means having two angularly spaced leg portions, each leg portion extending through one of the slots spaced from the surface of the oscillatable means, and ending in an outwardly located end portion secured to the supporting means, each leg portion of the suspension ribbon means being located in an axial plane passing through one leg portion of the other of the suspension ribbon means, each of the suspension ribbon means having an apex portion at the joining point of the leg portion located in the central chamber and passing around one of the cylindrical non-resilient clamping pins so that each of the leg portions is clamped between a resilient clamping pin and a non-resilient clamping pin and thereby secured to the oscillatable means so as to suspend the same for turning movement about the axis and to prevent transverse and axial movement of the same, the suspension ribbon means having a thickness smaller than the width of the slots and passing through the same spaced from the surface of the oscillatable means so as to permit limited oscillation of the oscillatable means about the axis for supporting a movable member connected thereto for limited angular movement.

Figure 2:
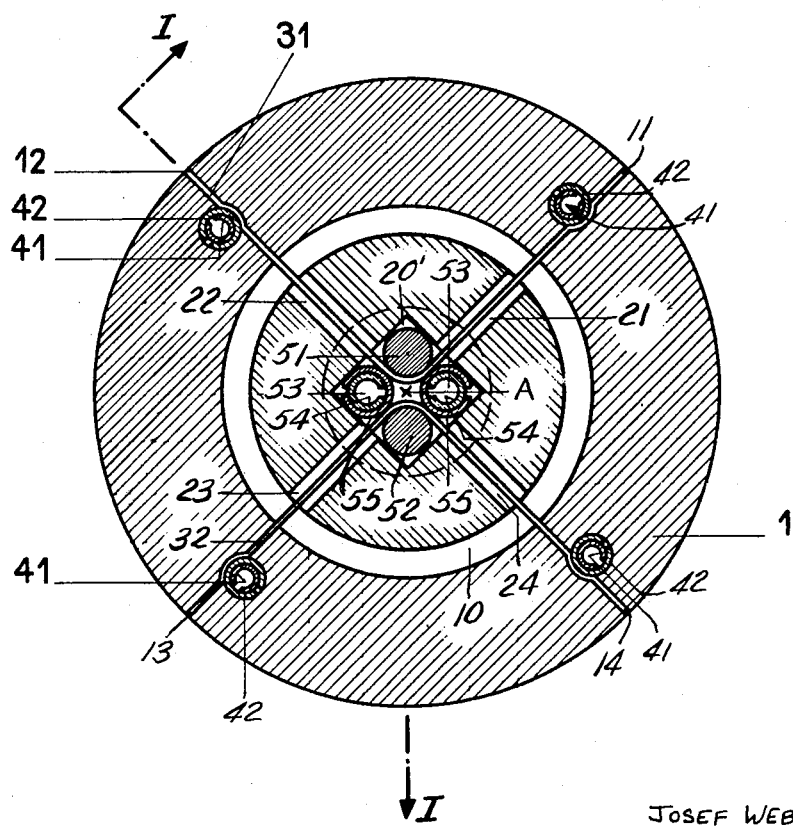

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a cross sectional view through a suspension arrangement according to the present invention taken on line I—I in Fig. 2; and Fig. 2 is a sectional view taken on line II—II in Fig. 1.

Referring now to the drawing, a member 2 is supported for oscillating movement about the axis A—A on the outer annular supporting means 1 by means of suspension ribbon means 31 and 32. Between the outer annular member 1 and the oscillatable means 2 there is an annular air gap 10. In the center of the oscillatable means 2 an axially extending square chamber 20 is provided into which four radially extending slots 21, 22, 23 and 24 open. The ends of the slots are located in the centers of the walls 20'. Radial slits 11, 12, 13 and 14 are provided in the outer annular supporting member 1 and are aligned with the radial slots in the oscillatable means 2. In the square chamber 20 four clamping means are arranged. Two pins 51, 52 are cylindrical rigid pins, while the other two clamping means are the resilient clamping pins 53 each consisting of a slotted sleeve 55 and a resilient inner pin 54 which tends to expand and to widen the corresponding sleeve 55.

Two suspension ribbon means 31, 32 are provided, the suspension ribbon 31 having one leg portion passing through the slit 11, an apex portion passing around the pin 51, and another leg portion passing through the slit 12. The suspension ribbon 32 passes through the slits 13 and 14, the apex portion being bent around the pin 52. The suspension ribbon means 31, 32 are clamped to the pins 51, 52 by the resilient clamping pins 53 and extend in exactly radial direction through the slots 21, 22 and 23, 24, respectively. The outer ends of the suspension ribbons 31, 32 are clamped in the slits 11, 12, 13 and 14 by clamping members, each clamping member consisting of a slotted sleeve 42 and a resilient pin 41, which are located in holes extending parallel to the axis of the annular supporting member 1. The intermediate portions of the suspension ribbons 31 and 32 which are located in the slots 21, 23, and the intermediate portions which are located in the slots 22, 24 are located in planes which are perpendicular to each other and pass through the axis A—A of the oscillatable means 2.

The device is assembled by placing the pins 51, 52, and the sleeves 55 in the square chamber 20, threading the suspension ribbons 31 and 32 through the slits 11 to 14 and the slots 21 to 24, and tensioning the suspension ribbons so as to exactly center the oscillatable means 2, whereupon the suspension ribbons are secured to the outer annular member 1 by means of the clamping members 41, 42 and the resilient pins 54 are inserted into the sleeves 55. The slotted sleeves 55 and 42, respectively, protect the ribbons from being damaged by the insertion of the resilient pins 54 and 41.

The thickness of the suspension ribbons 31 and 32 is smaller than the width of the radial slots 21 to 24 so that the suspension ribbons are spaced from the slot surfaces, and the oscillatable means 2 is free to perform small oscillations about the axis A—A.

The angle through which oscillation is possible depends on the width and length of the slots 21 to 24 and on the thickness of the suspension ribbons 31, 32 which never touch the surface of the slots 21 to 24 of member 2. Preferably the angle of oscillation is ±3 degrees.

The axial width and the thickness of the suspension ribbons as well as the radii of the pins 51, 52 and 53 in the chamber 20 are designed in such manner as to prevent transverse or axial movement of the oscillatable means 2 due to transverse or axial forces.

An element which is fixedly connected to the oscillatable member of the present invention is supported for oscillatory movement about the axis A—A, but cannot perform an axial or transverse motion due to the tension of the suspension ribbons.

It will be understood that each of the elements described above, or two or more together, may also find a useful application in other types of suspension arrangements differing from the types described above.

While the invention has been illustrated and described as embodied in a suspension arrangement in which a member is suspended for limited oscillatory movement about an axis by a plurality of radially extending tensioned suspension ribbons, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Suspension arrangement for oscillation about an axis, comprising, in combination, an outer annular member having an axis; an inner member having an axis coinciding with said axis of said outer annular member, said inner member being surrounded by said outer annular member, said inner member being formed with a plurality of radial slots located in the same transverse plane; and a plurality of straight and tensioned suspension ribbon means located in the same transverse plane and extending in radial direction through said slots spaced from the surface of said slots of said inner member and having outwardly located portions secured to said outer annular member, intermediate portions located in said slots, and inwardly located portions secured to said inner member in the region of said axis of the same inwardly of said slots, one of said members being suspended by said suspension ribbon means on the other of said members for oscillation about the axis thereof, said tensioned suspension ribbon means preventing transverse and axial movement of said one suspended member relative to said other member.

2. Suspension arrangement for oscillation about an axis, comprising, in combination, an outer annular member having an axis; an inner member having an axis coinciding with said axis of said outer annular member, said inner member being surrounded by said outer annular member, said inner member being formed with a plurality of radial slots and with a central chamber into which the inner ends of said radial slots open; clamping means located in said central chamber; and tensioned suspension ribbon means extending in radial direction through said slots spaced from the surface of said slots of said inner member and having outwardly located portions secured to said outer annular member, and inner portions located in said central chamber and secured to said inner member by said clamping means, one of said members being suspended by said suspension ribbon means on the other of said members for oscillation about the axis thereof, said tensioned suspension ribbon means preventing transverse and axial movement of said one suspended member relative to said other member.

3. Suspension arrangement for oscillation about an axis, comprising, in combination, an outer annular member having an axis; an inner member having an axis coinciding with said axis of said outer annular member, said inner member being surrounded by said outer annular member, said inner member being formed with a plurality of radial slots, and with a central chamber into which the inner ends of said slots open; clamping means located in said central chamber; a plurality of tensioned suspension ribbon means, each suspension ribbon means having two angularly spaced leg portions, each leg portion extending through one of said slots spaced from the surface of said slots of said inner member and ending in an outwardly located end portion secured to said outer annular member, each of said suspension ribbon means having an apex portion at the joining point of said leg portions located in said central chamber and clamped by said clamping means to said inner member, one of said members being suspended by said suspension ribbon means on the other of said members for oscillation about the axis thereof, said tensioned suspension ribbon means preventing transverse and axial movement of said one suspended member relative to said other member.

4. Suspension arrangement for oscillation about an axis, comprising, in combination, an outer annular member having an axis; an inner member having an axis coinciding with said axis of said outer annular member, said inner member being surrounded by said outer annular member, said inner member being formed with four equally spaced radial slots and with an axially extending square central chamber bounded by four walls, the inner ends of said radial slots opening in the centers of said walls; four cylindrical clamping pins located in said central chamber abutting against said walls; two tensioned suspension ribbon means, each suspension ribbon means having a pair of angularly spaced leg portions, each leg portion extending through one of said slots spaced from the surface of said slots of said inner member and ending in an outwardly located end portion secured to said outer annular member, each of said suspension ribbon means having an apex portion at the joining point of said leg portions located in said central chamber and passing around one of said clamping pins so that each of said leg portions is clamped between two adjacent clamping pins and thereby secured to said inner member, one of said members being suspended by said suspension ribbon means on the other of said members for oscillation about the axis thereof, said tensioned suspension ribbon means preventing transverse and axial movement of said one suspended member relative to said other member.

5. Suspension arrangement for oscillation about an axis, comprising, in combination, an outer annular member having an axis; an inner member having an axis coinciding with said axis of said outer annular member, said inner member being surrounded by said outer annular member, said inner member being formed with four equally spaced radial slots and with an axially extending square central chamber bounded by four walls, the inner ends of said radial slots opening in the centers of said walls; four cylindrical clamping pins located in said central chamber abutting against said walls; two tensioned suspension ribbon means, each suspension ribbon means having a pair of angularly spaced leg portions, each leg portion extending through one of said slots spaced from the surface of said slots of said inner member and ending in an outwardly located end portion secured to said outer annular member, each leg portion of each of said suspension ribbon means being located in an axial plane passing through one leg portion of the other of said suspension ribbon means, each of said suspension ribbon means having an apex portion at the joining point of said leg portions located in said central chamber and passing around one of said clamping pins so that each of said leg portions is clamped between two adjacent clamping pins and thereby secured to said inner member, one of said members being suspended by said suspension ribbon means on the other of said members for oscillation about the axis thereof, said tensioned suspension ribbon means preventing transverse and axial movement of said one suspended member relative to said other member.

6. A suspension arrangement for oscillation about an axis, comprising, in combination, an outer annular member having an axis; an inner member having an axis coinciding with said axis of said outer annular member, said inner member being surrounded by said annular member and being formed with a plurality of radial slots and with an axially extending central chamber bounded by a plurality of walls, the inner ends of said radial slots opening in the centers of said walls; a plurality of clamping pins arranged in said central chamber abutting against said walls; and tensioned suspension ribbon means extending in radial direction through said slots spaced from the surface of said slots of said inner member, and having outwardly located end portions secured to said annular outer member equally spaced from each other, and inwardly located portions located in said central chamber, each of said suspension ribbon means passing between two adjacent clamping pins and being clamped by the same to said inner member, one of said members being suspended by said suspension ribbon means on the other of said members for oscillation about the axis thereof, said tension suspension ribbon means preventing transverse and axial movement of said one suspended member relative to said other member.

7. A suspension arrangement for oscillation about an axis, comprising, in combination, an outer annular member having an axis; an inner member having an axis coinciding with said axis of said outer annular member, said inner member being surrounded by said annular member and being formed with four radial slots and with an axially extending square central chamber bounded by four walls, the inner ends of said radial slots opening in the centers of said walls; four clamping pins arranged in said central chamber abutting against said walls, two of said clamping pins being resilient and arranged alternately with the others of said clamping pins; and tensioned suspension ribbon means extending in radial direction through said slots spaced from the surface of said slots of said inner member, and having outwardly located end portions secured to said annular outer member equally spaced from each other, and inwardly located portions located in said central chamber, each of said suspension ribbon means passing between two adjacent clamping pins and being clamped by the same to said inner member, one of said members being suspended by said suspension ribbon means on the other of said members for oscillation about the axis thereof, said tension suspension ribbon means preventing transverse and axial movement of said one suspended member relative to said other member.

8. A suspension arrangement for oscillation about an axis, comprising, in combination, an outer annular member having an axis, and being formed with four equally spaced holes extending parallel to said axis, and with four slits extending in radial direction tangential to said holes; resilient clamping members located in said holes; an inner member having an axis coinciding with said axis of said outer annular member, said inner member being surrounded by said annular member and being formed with four radial slots and with an axially extending square central chamber bounded by four walls, the inner ends of said radial slots opening in the centers of said walls; four clamping pins arranged in said central chamber abutting against said walls, two of said clamping pins being resilient and arranged alternately with the others of said clamping pins; and tensioned suspension ribbon means extending in radial direction through said slots spaced from the surface of said slots of said inner member, and having outwardly located end portions passing through said radial slits in said outer annular member and being clamped by said clamping members to said annular outer member, and inwardly located portions located in said central chamber, each of said suspension ribbon means passing between two adjacent clamping pins and being clamped by the same to said inner member, one of said members being suspended by said suspension ribbon means on the other of said members for oscillation about the axis thereof, said tension suspension ribbon means preventing transverse and axial movement of said one suspended member relative to said other member.

9. Suspension arrangement for oscillation about an axis, comprising, in combination, oscillatable means having an axis of rotation and being formed with a plurality of radial slots; supporting means surrounding said oscillatable means; a plurality of radially extending tensioned suspension ribbon means having outwardly located portions secured to said supporting means equally spaced from each other, intermediate portions located in said slots and inwardly located portions located in the region of said axis of the same; and clamping means connected to and being located in the region of the axis of said oscillatable means and clamping said inwardly located portions of said suspension ribbon means together, said suspension ribbon means suspending said oscillatable means for turning movement about said axis and preventing transverse and axial movement of the same, said suspension ribbon means having a thickness smaller than the width of said slots and passing through the same spaced from the surface of said slots of said oscillatable means so as to permit limited oscillation of said oscillatable means about said axis.

10. Suspension arrangement for oscillation about an axis, comprising, in combination, oscillatable means having an axis of rotation and being formed with a plurality of radial slots and with an inner chamber into which the inner ends of said radial slots open; clamping means located in said central chamber; supporting means surrounding said oscillatable means; and a plurality of radially extending tensioned suspension ribbon means having outwardly located portions secured to said supporting means equally spaced from each other and inner portions located in said central chamber and being secured to said oscillatable means by said clamping means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

11. Suspension arrangement for oscillation about an axis, comprising, in combination, oscillatable means having an axis of rotation and being formed with a plurality of radial slots and with an inner chamber into which the inner ends of said radial slots open; clamping means located in said central chamber; supporting means surrounding said oscillatable means; and a plurality of radially extending tensioned suspension ribbon means, each suspension ribbon means having two angularly spaced leg portions, each leg portion extending through one of said slots spaced from the surface of said slots of said oscillatable means and ending in an outwardly located end portion secured to said supporting means, each of said suspension ribbon means having an apex portion at the joining point of said leg portions located in said central chamber and clamped by said clamping means to said oscillatable means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

12. Suspension arrangement for oscillation about an axis, comprising, in combination, oscillatable means having an axis of rotation and being formed with at least four radial slots, and with an axially extending inner chamber bounded by four walls, the inner ends of said radial slots opening at the centers of said wall; four clamping pins located in said central chamber abutting against said walls; supporting means surrounding said oscillatable means; and at least two tension suspension ribbon means, each suspension ribbon means having two angularly spaced leg portions, each leg portion extending through one of said slots spaced from the surface of said slots of said oscillatable means, and ending in an outwardly located end portion secured to said supporting means, each of said suspension ribbon means having an apex portion at the joining point of said leg portion located in said central chamber and passing around one of said clamping pins so that each of said leg portions is clamped between adjacent clamping pins and thereby secured to said oscillatable means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

13. Suspension arrangement for oscillation about an axis, comprising, in combination, oscillatable means having an axis of rotation and being formed with at least four radial slots, and with an axially extending square inner chamber bounded by four walls, the inner ends of said radial slots opening at the centers of said wall; four clamping pins located in said central chamber abutting against said walls; supporting means surrounding said oscillatable means; and at least two tension suspension ribbon means, each suspension ribbon means having two angularly spaced leg portions, each leg portion extending through one of said slots spaced from the surface of said slots of said oscillatable means, and ending in an outwardly located end portion secured to said supporting means, each leg portion of said suspension ribbon means being located in an axial plane passing through one leg portion of the other of said suspension ribbon means, each of said suspension ribbon means having an apex portion at the joining point of said leg portion located in said central chamber and passing around one of said clamping pins so that each of said leg portions is clamped between adjacent clamping pins and thereby secured to said oscillatable means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

14. Suspension arrangement for oscillation about an axis, comprising, in combination, oscillatable means having an axis of rotation and being formed with at least four radial slots, and with an axially extending square inner chamber bounded by four walls, the inner ends of said radial slots opening at the centers of said wall; four clamping pins located in said central chamber abutting against said walls, two of said clamping pins being resilient, and the other two of said clamping pins being cylindrical and non-resilient, said resilient and said non-resilient clamping pins being alternately arranged; supporting means surrounding said oscillatable means; and at least two tension suspension ribbon means, each suspension ribbon means having two angularly spaced leg portions, each leg portion extending through one of said slots spaced from the surface of said slots of said oscillatable means, and ending in an outwardly located end portion secured to said supporting means, each leg portion of said suspension ribbon means being located in an axial plane passing through one leg portion of the other of said suspension ribbon means, each of said suspension ribbon means having an apex portion at the joining point of said leg portion located in said central chamber and passing around one of said cylindrical non-resilient clamping pins so that each of said leg portions is clamped between a resilient clamping pin and a non-resilient clamping pin and thereby secured to said oscillatable means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

15. Suspension arrangement for oscillation about an axis, comprising, in combination, oscillatable means having an axis of rotation and being formed with at least four radial slots, and with an axially extending square inner chamber bounded by four walls, the inner ends of said radial slots opening at the centers of said wall; four clamping pins located in said central chamber abutting against said walls, two of said clamping pins being resilient, and the other two of said clamping pins being cylindrical and non-resilient, said resilient and said non-resilient clamping pins being alternately arranged; annular supporting means surrounding said oscillatable means and being formed with four radial slits; and at least two tension suspension ribbon means, each suspension ribbon means having two angularly spaced leg portions, each leg portion extending through one of said slots spaced from the surface of said slots of said oscillatable means, and ending in an outwardly located end portion located in one of said slits and secured to said supporting means, each leg portion of said suspension ribbon means being located in an axial plane passing through one leg portion of the other of said suspension ribbon means, each of said suspension ribbon means having an apex portion at the joining point of said leg portion located in said central chamber and passing around one of said cylindrical non-resilient clamping pins so that each of said leg portions is clamped between a resilient clamping pin and a non-resilient clamping pin and thereby secured to said oscillatable means so as to suspend said oscillatable means for turning movement about said axis and to prevent transverse and axial movement of the same, said suspension ribbon means having a thickness smaller than the width of said slots and passing through the same spaced from the surface of said slots of said oscillatable means so as to permit limited oscillation of said oscillatable means about said axis.

16. An arrangement as claimed in claim 14 wherein each of said resilient clamping pins consists of an outer longitudinally slotted sleeve, and an inner resilient pin inserted into said sleeve and urging the same apart.

17. An arrangement as claimed in claim 15 wherein said suspension ribbon means are clamped in said slits by resilient pins.

References Cited in the file of this patent
UNITED STATES PATENTS

| | | |
|---|---|---|
| Re. 22,330 | Draper | June 8, 1943 |
| 2,109,627 | Finch | Mar. 1, 1938 |
| 2,687,647 | Ashworth | Aug. 31, 1954 |

FOREIGN PATENTS

| | | |
|---|---|---|
| 663,204 | France | Mar. 30, 1929 |
| 718,411 | France | Nov. 4, 1931 |